Patented Dec. 16, 1930

1,784,950

UNITED STATES PATENT OFFICE

MARVIN J. UDY, OF NIAGARA FALLS, NEW YORK, ASSIGNOR TO ELECTRO METALLURGICAL CO., A COMPANY OF WEST VIRGINIA

PROCESS OF PRODUCING CHROMIC ACID

No Drawing.  Application filed December 16, 1927. Serial No. 240,637.

My invention relates to chromium compounds and particularly to methods for the production of chromic acid.

Chromic acid is a substance of technical importance for many purposes, and it is frequently desired in a condition of high purity. Difficulty has, however, been encountered in the development of a process which is both simple to operate, convenient, and capable of producing chromic acid material of high purity.

My invention provides a new and improved process for the manufacture of chromic acid, of high purity with a minimum amount of processing and a minimum number of operations. My process consists in a precipitation, solution and crystallization of chromic acid through a new sequence of steps, which to a high degree eliminates the common impurities, such as iron and alkali metals as well as the less common impurities. By the process of my invention I have thus greatly simplified the operations incident to the preparation of chromic acid of high purity.

Other objects and details of my invention will be apparent from the following description.

It is well known in the art, that lead chromate, $PbCrO_4$, is readily precipitated by treatment of almost any soluble chromate with a lead salt. Lead chromate is one of the more stable compounds, being widely used for a pigment, and being considered relatively insoluble in most ordinary materials, including sulphuric acid. I find, however, that by a suitable choice of concentration, lead chromate may, by treatment with sulphuric acid, be converted into lead sulphate and free chromic acid. This is an equilibrium reaction which with dilute acid proceeds only to a barely perceptible extent. If, however, a relatively concentrated acid is used, the equilibrium point lies towards a condition of a much greater conversion to lead sulphate and chromic acid, and by the use of a sufficiently strong acid the reaction may be caused to proceed nearly to completion. It is however, desirable that too strong acid be avoided since it tends to cause crystallization or precipitation of chromic acid with the lead sulphate. I find that this crystallization tends to take place at about 85% $H_2SO_4$ in the cold. Accordingly I find it preferable to make use of an acid having a strength of about 50° Baumé which is strong enough to carry the reaction sufficiently far toward completion to be satisfactory from a technical point of view, and the same time not strong enough to cause the crystallization of chromic acid with the lead sulphate. The lead compounds may then be filtered out from the mixture for re-use and the chromic acid may be recovered by concentration and crystallization of the filtrate.

The raw material containing the chromic acid radical to be recovered by my process may be any one of various convenient substances or mixtures, but is preferably in the form of a soluble chromate, which may however, be contaminated with considerable quantities of impurities.

I find that lead sulphate is readily converted to lead chromate by the application thereto of a soluble chromate, and I accordingly treat the crude chromate containing material with lead sulphate, which may conveniently be in a condition of relatively fine sub-division and which may conveniently be brought into suspension in the solution of the chromate compound. The reaction proceeds rapidly and quite completely, producing lead chromate mixed with more or less undecomposed lead sulphate. The insoluble material is then removed by appropriate filtration, which may if desired include appropriate washing or other purifying steps, from the liquid.

The lead compounds may then be treated with sulphuric acid of about 50° Baumé strength which may be used cold if desired, but is preferably used warm or hot. The acid causes the conversion of the lead chromate as before outlined to lead sulphate and chromic acid, which conversion may or may not be substantially complete as desired, according to the condition. The lead compounds may then be filtered from the mixture, and are then available for re-use to form further lead chromate, by a cyclic return to earlier stages of the process. The filtrate may then be concentrated by appropriate means and the chromic acid crystallized out and removed. The process may be so conducted that the chromic acid is substantially pure, and free from iron or sodium compounds. It may however, contain small quantities of sulphuric acid which are however readily removed by further appropriate treatment such as further recrystallization. My process thus produces by a simple sequence of operations a very pure chromic acid.

The sequence of operations thus described may be represented by the following set of equations.

(1) 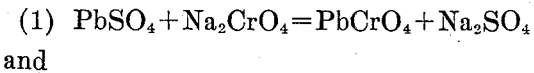

and (2) 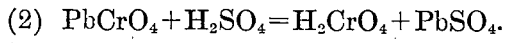

Equation (1) indicates the reaction between lead sulphate and a soluble chromic acid compound, represented by sodium chromate, to produce lead chromate and sodium sulphate, the lead chromate forming a precipitate, together with any unchanged lead sulphate, and the sodium sulphate remaining in solution. The second equation shows the reaction between the separated lead chromate and the sulphuric acid to form lead sulphate which remains in the solid form, and chromic acid which dissolves in the water.

It may be noted in connection with these equations that an excess of lead sulphate may be added without injury and that when so added a very clean separation of the chromium compounds from the solution occurs and that the presence of an excess of lead sulphate does not interfere with this or the following reaction. It may be further noted that the excess of sulphuric acid is readily separated from the chromic acid by the described crystallization step. It is to be further noted that the lead is in the same form at the close of the sequence of steps as at the beginning, and accordingly the residual lead sulphate is particularly well adapted to be re-used in a cyclic process. This has the further advantage, that complete separation of all the chromium from the lead is not necessary, to prevent technical loss, but that any unchanged lead chromate remaining after the application of the second reaction is returned to the process so that no loss occurs. Furthermore the acid solution remaining from the crystallization of the chromic acid is also adapted to a cyclic re-use since it may be fortified with further acid, brought to the proper concentration and used for the conversion of more lead chromate. Thus the valuable constituents, are so treated that no opportunity for loss occurs. Thus the process is particularly well adapted to a cyclic system. When so used, the raw materials may consist only of the chromium containing solution and sulphuric acid, and only an extremely small amount of lead sulphate is required for make-up material. This amount is small since the solubility of lead sulphate or lead chromate in the crude chromium solution is very small, and this solubility is substantially the only cause of loss.

My process is further adapted to the separation of chromic acid from preparations containing substantial quantities of iron. One of the simplest methods for obtaining chromium from its ores is to reduce the ores by means of carbon or some other suitable reducing agent at a high temperature. The commercial ores of chromium all contain relatively large percentages of iron which is reduced simultaneously with the chromium to form an iron chromium alloy or ferro-chrome. Such an alloy is a convenient material for the production of chromium compounds by electrolytic treatment as disclosed in my copending application, Serial No. 113,335, filed June 2, 1926, in which a new and advantageous method for the production of chromic acid containing material from a ferro-chrome alloy is disclosed. This process results in the production of a chromic acid solution containing substantial quantities of iron in various forms. In this copending application is disclosed an adequate method for the separation of iron from the chromium. I find, however, that the process here disclosed has features of convenience which make it advantageous for use with the product obtained from the electrolytic cells as described therein. The material is found to contain a portion of the chromium in the form of chromic acid, a portion of the iron as ferric sulphate and a portion of both in the form of an iron salt of chromic acid, as well as sulphuric acid. With this mixed material as a supply of chromium compounds, I proceed by carefully neutralizing the excess acid with an alkali such as soda or lime, in the case of lime removing the precipitated calcium sulphate so as to leave a clear solution. The treatment may then be continued by the addition of lead sulphate as before. This reaction similarly yields a precipitate of lead chromate leaving the iron and other substances in solution. The precipitated lead chromate may then be separated and treated as before with 50° Baumé acid, for the production of lead sulphate to be returned to the appropriate stage of the cyclic process, and the chromic acid solution from which the solid chromic acid may be recovered by crystallization.

I have not as yet been able to prove to my own satisfaction the exact character of the chemical combination between the iron and chromium. It may be that the combination is such as to produce ferrous chromate. Some of the material at least may be in this form, in which case the reactions are represented by the following set of equations:

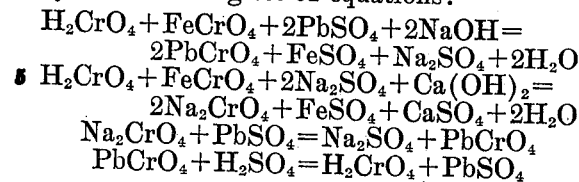

These equations show the process of the conversion of ferrous chromate to ferrous sulphate and lead chromate, as well as the conversion of the chromic acid present to lead chromate.

On the other hand a portion at least of the material may be combined in the form of a ferric chromate. The reactions of such portion of the substances as are in this form are represented by the following set of equations:

$$Fe_2(CrO_4)_3 + 3PbSO_4 =$$
$$3PbCrO_4 + Fe_2(SO_4)_3$$
$$PbCrO_4 + H_2SO_4 = H_2CrO_4 + PbSO_4$$

This reaction may occur simultaneously with that previously indicated, as well as with various other possible reactions.

In view of the fact that the solution is strongly acidic in character, a portion of the material may also be present in the form of ferric bi-chromate, in which case the process is represented by the following set of equations.

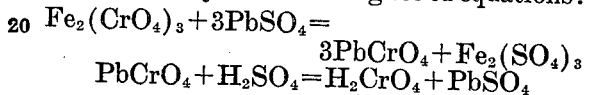

As previously outlined this process also is particularly well adapted for cyclic utilization, for the same reasons, since the change in reactions used does not essentially alter the basic principles of the process nor the essential methods of operation.

Under certain conditions it may be preferred to remove the iron from the solution before an introduction of the lead compounds, in which case it may be precipitated as the hydroxide according to the following sequence of equations, the precipitated ferric hydroxide being removed by appropriate filtration before the addition of the lead salt.

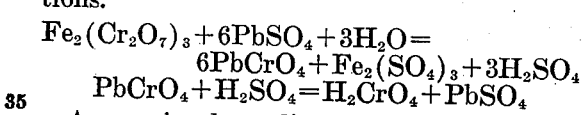

It is of course possible to use either soda or lime, or other appropriate neutralizing substance without departure from the spirit of the invention.

By the process of my invention I have thus provided means for the simple and highly convenient and efficient purification of chromic acid compounds for the production of chromic acid of high purity.

While I have shown but a single embodiment of my invention it is capable of various modifications therefrom without departure from the spirit thereof and I desire therefore that only such limitations shall be imposed thereon as are required by the prior art or indicated by the appended claims.

I claim as my invention:

1. The process of recovering chromic acid from solutions containing soluble salts of chromic acid which comprises causing the solution to react with lead sulphate to form lead chromate, separating the latter from the solution, decomposing the lead chromate with sulphuric acid of such a concentration as to directly precipitate lead sulphate and simultaneously form a solution of chromic acid substantially free from dissolved salts, separating the lead sulphate from the solution, and recovering chromic acid from the solution.

2. The process of recovering chromic acid from solutions containing soluble salts of chromic acid which comprises causing the solution to react with lead sulphate to form lead chromate, separating the latter from the solution, decomposing the lead chromate with sulphuric acid of approximately 50° Bé. to directly precipitate lead sulphate and simultaneously form a solution of chromic acid substantially free from dissolved salts, separating the lead sulphate from the solution, and recovering chromic acid from the solution.

3. The process of recovering chromic acid from solutions containing soluble salts of chromic acid which comprises causing the solution to react with lead sulphate to form lead chromate, separating the latter from the solution, decomposing the lead chromate with sulphuric acid of such a concentration as to directly precipitate lead sulphate and simultaneously form a solution of chromic acid substantially free from dissolved salts, separating the lead sulphate from the solution, recovering chromic acid from the solution, and causing the lead sulphate to react with a second portion of the solution first recited.

4. The process of recovering chromic acid from solutions containing soluble salts of cromic acid which comprises causing the solution to react with lead sulphate to form lead chromate, separating the latter from the solution, decomposing the lead chromate with sulphuric acid of approximately 50° Bé. to directly precipitate lead sulphate and simultaneously form a solution of chromic acid substantially free from dissolved salts, separating the lead sulphate from the solution, recovering chromic acid from the solution, and causing the lead sulphate to react with a second portion of the solution first recited.

In testimony whereof, I affix my signature.

MARVIN J. UDY.